Paul F. Hayner
George J. Shomphe
*INVENTORS*

Sept. 19, 1961   P. F. HAYNER ET AL   3,000,363
TWO STAGE HYDRAULIC SERVO VALVE
Filed March 31, 1959   3 Sheets-Sheet 2

Paul F. Hayner
George J. Shomphe
INVENTORS

Paul F. Hayner
George J. Shomphe
INVENTORS

｟United States Patent Office｠  3,000,363
Patented Sept. 19, 1961

3,000,363
TWO STAGE HYDRAULIC SERVO VALVE
Paul F. Hayner and George J. Shomphe, Nashua, N.H., assignors to Sanders Associates, Inc., Nashua, N.H., a corporation of Delaware
Filed Mar. 31, 1959, Ser. No. 803,169
3 Claims. (Cl. 121—46.5)

This invention relates to the art of hydraulic control. More particularly, this invention relates to hydraulic amplifier valves as used in servo systems. This application is a continuation-in-part of co-pending application Serial No. 404,684, filed January 18, 1954, and now abandoned.

The hydraulic amplifier valve converts a small input signal into a flow of fluid under pressure. In a two-stage unit a small displacement of a pilot piston valve, in the first stage, permits a fluid under pressure to displace a control piston valve which, in turn, regulates an output fluid flow. The term "fluid" as used herein includes gaseous and liquid substances.

In prior art, hydraulic valves of the type described have been subject to defective operation because of the presence of foreign particles in the fluid. Since the pilot piston valve may be displaced by a small input force, only a small force is required to retard its action. In conventional practice, an intricate filtering system is employed to minimize the presence of foreign particles that might cause the pilot piston valve to become inoperative. In the present invention, internal mechanical feedback from the control piston valve exerts on the pilot valve a force much greater than the signal to eliminate the retarding force.

In a pilot valve stage having a slide sleeve-valve which surrounds a slide piston valve, these particles tend to become lodged between the two valves. The differential displacement therebetween controls the output flow of fluid in amplitude and direction: in a two-stage valve having internal feedback, both pilot valve are displaced to an extreme position when a foreign particle is lodged between them. By stopping the piston-valve before the sleeve-valve completes its travel, the particle may be sheared off and the obstruction removed.

It is, therefore, an object of the present invention to provide an improved two-stage hydraulic servo valve substantially immune to defective operation due to foreign particles obstructing the pilot stage.

Another object of this invention is to provide an improved hydraulic amplifier valve that is reliable in operation.

A further object of this invention is to provide an improved hydraulic amplifier valve having an output fluid flow directly proportional to an input displacement force.

A still further object of this invention is to provide an improved hydraulic amplifier valve with rapid response to an input signal displacement.

Other objects of this invention will be apparent from the following description of a typical embodiment thereof, taken in connection with the accompanying drawings.

In accordance with this invention, there is provided an amplifier valve adapted to control a source of fluid under pressure. A pilot cylinder having a reciprocating sleeve within the cylinder and a pilot piston within the sleeve, and a control cylinder enclosing a control piston valve, are provided. Ports connect the source of fluid with the interior of the sleeve through apertures in the sleeve and the pilot cylinder and other ports provide connections between the pilot cylinder and the control cylinder. A lever connects the control cylinder and the sleeve for effecting their joint movement such that a relatively large displacement of the control piston valve effects a relatively small displacement of the sleeve. A solenoid torque motor controls the pilot piston valve selectively to open and close the ports in the sleeve to apply the fluid to selected ports of the control cylinder and to be applied selectively through output ports of the control cylinder whereby, when the pilot piston valve is displaced, the sleeve is displaced in the same direction under increased pressure to control the opening of the ports and discontinue the displacement of the control piston valve. The displacement of the control piston valve permits an output fluid flow at a rate proportional to the electric current in the solenoid.

Stops are provided to restrict the motion of said pilot piston valve relative said sleeve valve, whereby foreign particles lodged between said pilot piston and ports in said sleeve are sheared off to restore proper operation.

Figure 1:
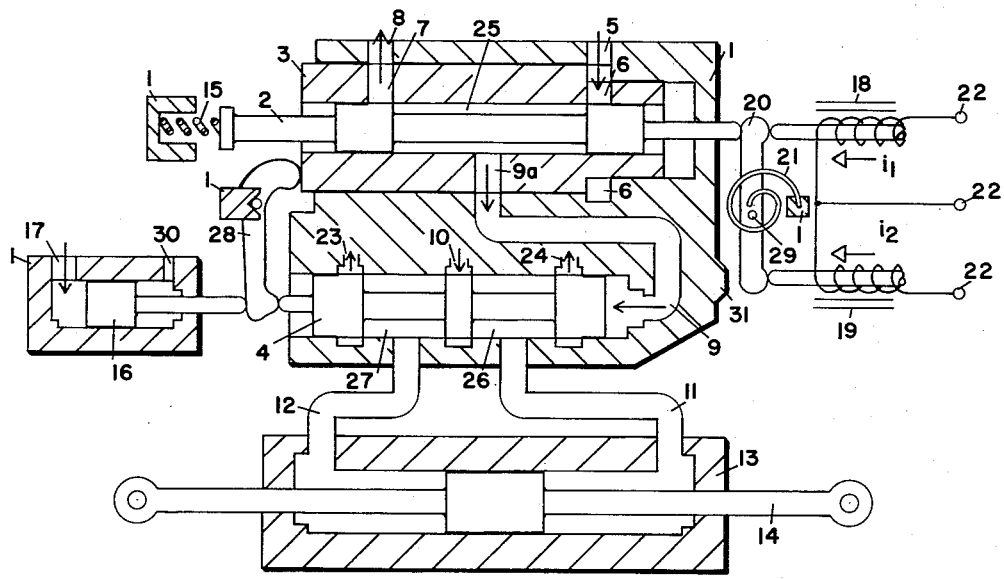
FIG. 1 is a cross-sectional view of a two-stage hydraulic amplifier valve, embodying this invention and shown connected to an output cylinder, under the condition of no signal input.
Figure 2:
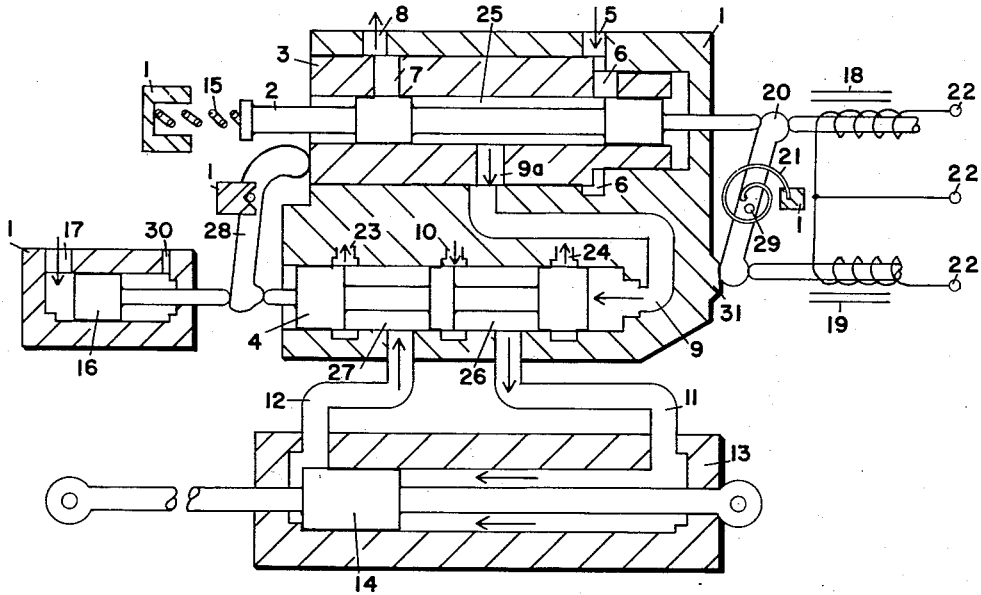
FIG. 2 is a cross-sectional view of the amplifier valve in FIG. 1, illustrating displacements due to an input signal.
Figure 3:
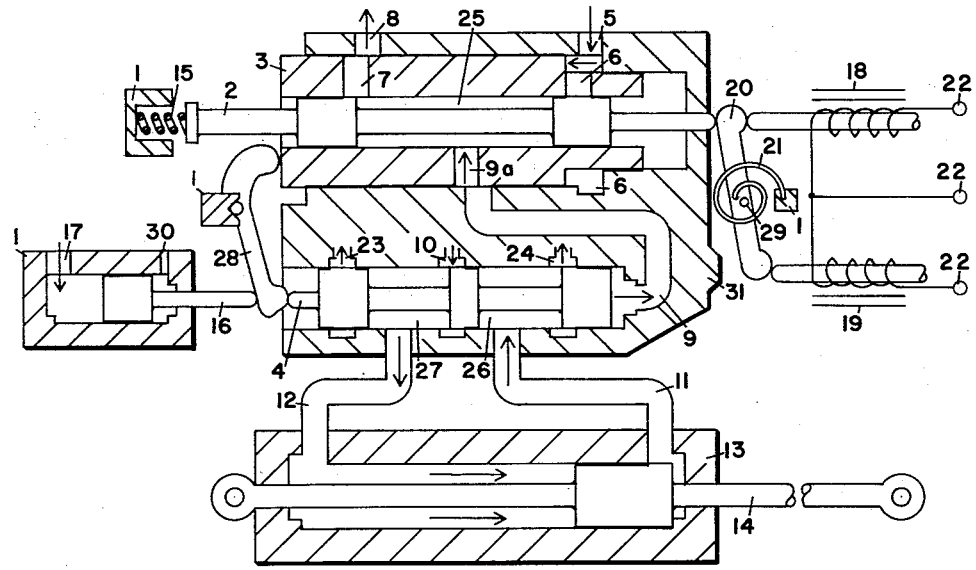
FIG. 3 is a cross-sectional view of the amplifier valve in FIG. 1, illustrating displacements due to an input signal of opposite polarity to that of FIG. 2.

Referring now to the drawings and with particular reference to FIGS. 1–3, there is here illustrated a two-stage hydraulic amplifier valve embodying the present invention. A valve body or casing 1 embodies a pilot cylinder, having a reciprocating pilot piston valve 2 surrounded by a reciprocating follow-up sleeve 3, and a control cylinder which surrounds a reciprocating control piston valve 4. Pressure port 5 connects a source of fluid under pressure to a chamber 6 of follow-up sleeve 3. The fluid is returned to the source through an aperture 7 of sleeve 3 and an exhaust port 8. The pilot piston valve 2 is constrained by pressure exerted on it by centering spring 15.

An input electrical signal is coupled through terminals 22 to energize a torque motor, comprising solenoids 18 and 19, armature 20 and torsion spring 21, to control the displacement of pilot piston valve 2. The armature 20 pivots about a pivot 29 attached to the casing 1. One end of the spring 21 is attached to the armature 20 and the other to the casing 1, as shown. The motion of the armature 20 is restricted by a stop 31 formed in the casing 1. This limits the travel of the piston 2 to the right. The travel of the piston 2 to the left is restricted by the stop presented by the casing 1 surrounding the spring 15 as shown.

The piston valve 2 controls ports 5 and 8 selectively to apply pressure to or evacuate through a port 9a in the sleeve 3, a passage 9 connected to control piston valve 4. The piston valve 4 selectively applies fluid under pressure from port 10 through feedlines 11 and 12 to an output actuating device such as the output cylinder 13 with output piston 14, as shown.

The piston valve 4 is mechanically coupled through feedback lever 28 to follow-up sleeve 3. A compensating piston 16, under fluid pressure through pressure port 17 and exhaust port 30 formed in casing 1, functions as a hydraulic pressure spring to position piston 4. The piston 16 works in conjunction with a force acting on follow-up sleeve 3 due to fluid pressure in chamber 6. The exhaust ports 23 and 24 in the control cylinder provide return passages for the fluid when the piston valve 4 is displaced. The pressure ports 5, 7 and 10 are connected together to the source of fluid pressure; the exhaust ports 8, 23, 24 and 30 have a common return.

The operation of the valve will be considered for three conditions—neutral, an input signal tending to displace the pilot piston valve 2 to the right and an input signal of opposite polarity tending to displace the piston 2 to the left. In the drawings, open-headed arrows indicate the direction of fluid flow and filled-headed arrows indicate the direction of mechanical motion.

In the neutral position, as in FIG. 1, the pilot piston valve 2 occludes pressure ports 5 and exhaust port 8 from chamber 25 surrounding the undercut portion of pilot piston valve 2. In this neutral condition approximately half of the total fluid pressure available is present in chamber 25 and applied through passage 9 to exert a force tending to displace control piston valve 4 to the left. The follow-up sleeve 3 also has a force acting on it tending to displace it to the left due to the pressure in chamber 6. In the neutral condition the two torque motor currents $i_1$ and $i_2$ are equal and opposite in character and cause no deflection of the torque motor armature 20 from its central position. Since the control piston valve 4 occludes exhaust ports 23 and 24 and pressure port 10, the forces acting on output piston 14 are also in equilibrium.

When, as in FIG. 2, the pilot piston valve is displaced to the right, in response to a deflection of the torque motor armature 20, the fluid under pressure is applied through port 5, chamber 6, pilot cylinder chamber 25 and passage 9 to exert a force to displace control piston valve 4 to the left and open pressure port 10 and exhaust port 23. The fluid under pressure passes through chamber 26 of the control cylinder and feedline 11 to deflect the output piston 14 to the left. Fluid in the cylinder returns through feedline 12, chamber 27 and exhaust port 23. When the piston valve 4 is displaced to the left, lever 28 causes follow-up sleeve 3 to be displaced to the right and occlude port 5 to discontinue further displacement of the control piston valve 4. The output piston 14 will continue to be displaced to the left until such time as the control piston valve is restored to its neutral position. In a servo system the piston 14 may be coupled to an output sensing device which restores the balance between $i_1$ and $i_2$ to cancel the initiating signal and restore pilot piston valve 2 and control piston valve 4 to neutral positions.

When the pilot piston valve is displaced to the left, as in FIG. 3, in response to deflection of the armature 20, exhaust port 8 is opened to evacuate chamber 25 and passage 9. Fluid under pressure from port 5 acting in chamber 6 displaces the follow-up sleeve to the left, applies pressure through lever 28 to displace control piston valve 4 to the right and opens pressure port 10 and exhaust port 24. Fluid under pressure is now applied through chamber 27 feedline 12 to the left side of the output piston 14 and displaces it to the right; the fluid returns through feedline 11, chamber 26 and exhaust port 24. Since the force acting on the control piston valve 4 from the right has been removed the compensating piston 16 aids in displacing the control piston valve to the right.

Figure 4:
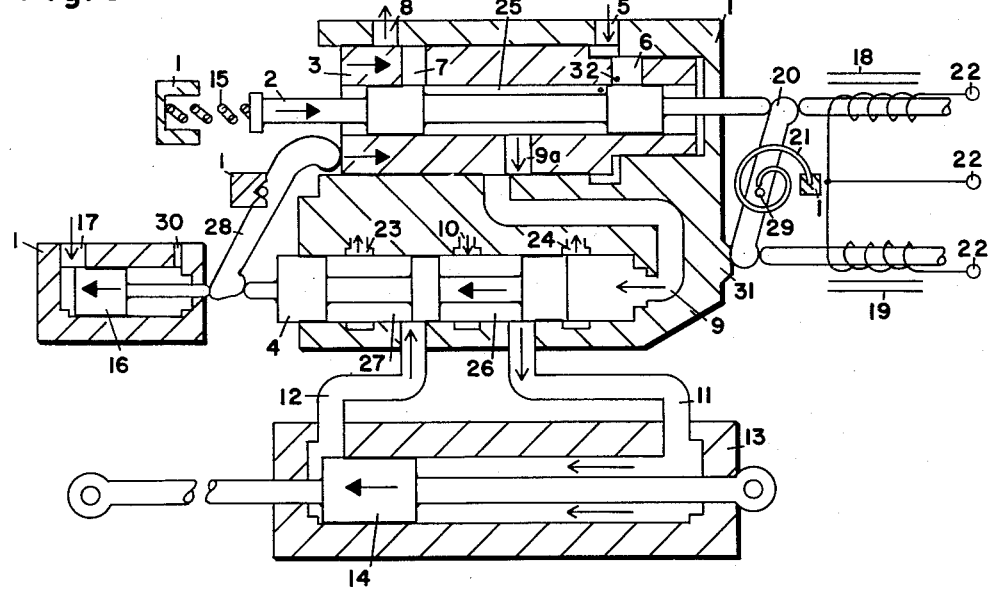
FIG. 4 is a cross-sectional view of the valve in FIG. 1 illustrating the operation of the valve in the presence of a foreign particle producing motion in one direction.
Figure 5:
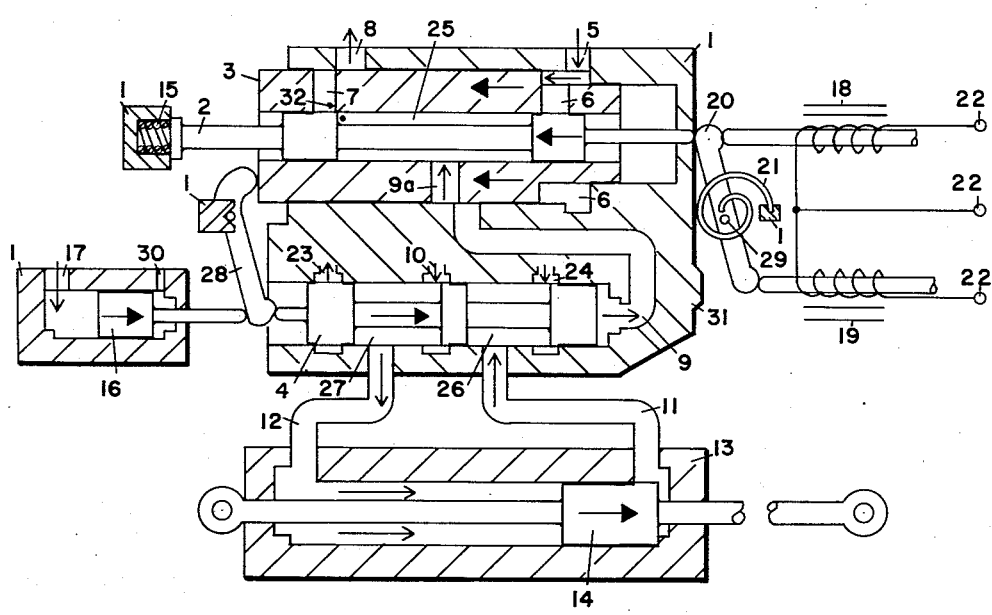
FIG. 5 is a cross-sectional view of the valve in FIG. 1 illustrating the operation of the valve in the presence of a foreign particle producing motion in the other direction.

Referring now to FIGS. 4 and 5, there is here illustrated the valve when a foreign particle or "chip" obstructs the action of the pilot valve.

The defects of other hydraulic valves due to sticking of pistons as a result of foreign matter has been previously mentioned. A hydraulic servo valve embodying the present invention does not have these sticking problems, exhibiting a unique "chip-clearing action." Thus, with particular reference to FIG. 4, if a chip 32 or foreign particle is lodged between the right-hand land of the piston valve 2, as shown, and the left-hand wall of the port 6, fluid under pressure continues to be impressed upon the right-hand side of the control piston valve 4. By virtue of the linkage through the feedback lever 28 there is an enormous mechanical force applied to the sleeve valve 3 to direct it to the right. This motion causes the piston valve 2 to continue to move to the right until the lower end of the armature 20 of the solenoid force motor strikes the housing at stop 31. There is thus provided a "stop" affixed to the housing 1 to limit the motion of the piston valve 2. The amplified force of the fluid under pressure acting on the control piston valve 4, however, continues to be impressed through the lever 28 upon the sleeve valve 3 and causes it to shear through such a particle and clear the pilot valve so that it may return to proper operation. Referring to FIG. 5, if a particle 32 is lodged between the left-hand land of the piston valve 2 and the right wall of the port 7 in the sleeve valve 3, the chamber 25 is exhausted to reduce the pressure acting on the right side of the control piston valve 4. Fluid under pressure surrounding the flanged portion of the sleeve-valve 3 and acting against the housing 1 is applied against the right side of the sleeve valve 3 to cause it to move to the left until it strikes the stop provided by the housing 1 surrounding the spring 15. At that time fluid under pressure continues to be applied to the sleeve valve 3 to force it to the left and shear through the particle. It will be apparent that the travel of the piston 2 is restricted before the sleeve valve 3 has reached its limit, thereby enabling the "chip-clearing action."

A hydraulic amplifier valve embodying this invention and comprising a single stage such as the pilot piston valve only may be used to directly control an output actuating device. Electrical feedback may then be eliminated.

The reliable operation and durable construction made possible by the present invention greatly enhances the utility of hydraulic amplifier valves; the advantages of hydraulic amplifier valves over other mechanisms may now be fully realized.

While there has been hereinbefore described what is at present considered a preferred embodiment of the invention, it will be apparent that many and various changes and modifications may be made with respect to the embodiment illustrated without departing from the spirit of the invention. It will be understood, therefore, that all those changes and modifications as fall fairly within the scope of the present invention, as defined in the appended claims, are to be considered as a part of the present invention.

What is claimed is:

1. A two-stage hydraulic servo valve adapted to control a source of fluid under pressure, comprising: a housing; a pilot cylinder formed in said housing; a reciprocating sleeve valve in said cylinder, a pilot port being formed in said housing and said sleeve valve for connecting said source of fluid with the interior of said sleeve valve; a reciprocal, pilot piston valve in said sleeve valve adapted selectively to open and close said sleeve valve ports when said pilot piston valve is displaced relative to said sleeve valve; a control cylinder in said housing connected to said pilot cylinder through a passageway in said housing, an input control port formed in said housing for connecting said source of fluid with the interior of said control cylinder and an output port formed in said housing for connecting the interior of said control cylinder to an output actuator device; a reciprocal, control piston valve in said control cylinder adapted selectively to open and close said input control port in response to variations in fluid under pressure in said passageway to said pilot cylinder and apply said fluid through said output port; a means connecting said control piston valve and said sleeve valve for effecting their joint movement such that displacement of said control piston valve effects a counter displacement of said sleeve valve; motor means coupled to said pilot piston valve and affixed to said housing for controlling said pilot piston valve selectively to open and close said ports in said sleeve valve to apply said fluid through said passageway to said control cylinder, whereby when said pilot piston valve is displaced, said sleeve valve is displaced in the same direction under increased pressure further to control the closing of said sleeve-valve ports and discontinue the displacement of said control piston valve, thereby providing a flow of fluid through said output port that varies in proportion to the displacement of said pilot piston valve relative to said housing; and stops associated with said housing to limit the motion of said pilot piston valve in a given direction while permitting the continued motion of said sleeve valve and said control piston valve, whereby when said motion of said pilot piston valve has been limited by said stops, fluid under pressure continues to be impressed on said sleeve valve to shear through such particles as may become wedged between said pilot piston valve and said sleeve valve.

2. A two-stage hydraulic servo valve adapted to control a source of fluid under pressure, comprising: a housing; a pilot cylinder formed in said housing; a reciprocating sleeve valve in said cylinder, a pilot port being formed in said housing and said sleeve valve for connecting said source of fluid with the interior of said sleeve valve; a reciprocal, pilot piston valve in said sleeve valve adapted selectively to open and close said sleeve valve ports when said pilot piston valve is displaced relative to said sleeve valve; a control cylinder in said housing connected to said pilot cylinder through a passageway in said housing, an input control port formed in said housing for connecting said source of fluid with the interior of said control cylinder and an output port formed in said housing for connecting the interior of said control cylinder to an output actuator device; a reciprocal, control piston valve in said control cylinder adapted selectively to open and close said input control port in response to variation in fluid under pressure in said passageway to said pilot cylinder and apply said fluid through said output port; a single degenerative feedback lever having its fulcrum so positioned as to produce a mechanical feedback with a ratio greater than one and connecting said control piston valve and said sleeve valve for effecting their joint movement such that displacement of said control piston valve effects a counter displacement of said sleeve valve; motor means coupled to said pilot piston valve and affixed to said housing for controlling said pilot piston valve selectively to open and close said ports in said sleeve valve to apply said fluid through said passageway to said control cylinder, whereby when said pilot piston valve is displaced, said sleeve valve is displaced in the same direction under increased pressure further to control the closing of said sleeve valve ports and discontinue the displacement of said control piston valve, thereby providing a flow of fluid through said output port that varies in proportion to the displacement of said pilot piston valve relative to said housing; and stops associated with said housing to limit the motion of said pilot piston valve in a given direction while permitting the continued motion of said sleeve valve and said control piston valve, whereby when said motion of said pilot piston valve has been limited by said stops, fluid under pressure continues to be impressed on said sleeve valve to shear through such particles as may become wedged between said pilot piston valve and said sleeve valve.

3. A two-stage hydraulic servo valve adapted to control a source of fluid under pressure, comprising: a housing; a pilot cylinder formed in said housing; a reciprocating sleeve valve in said cylinder, a pilot port being formed in said housing and said sleeve valve for connecting said source of fluid with the interior of said sleeve valve; a reciprocal, pilot piston valve in said sleeve valve adapted selectively to open and close said sleeve valve ports when said pilot piston valve is displaced relative to said sleeve valve; a control cylinder in said housing connected to said pilot cylinder through a passageway in said housing, an input control port formed in said housing for connecting said source of fluid with the interior of said control cylinder and an output port formed in said housing for connecting the interior of said control cylinder to an output actuator device; a reciprocal, control piston-valve in said control cylinder adapted selectively to open and close said input control port in response to variations in fluid under pressure in said passageway to said pilot cylinder and apply said fluid through said output port; a lever connecting said control piston valve and said sleeve valve for effecting their joint movement such that displacement of said control piston valve effects a counter displacement of said sleeve valve; motor means coupled to said pilot piston valve and affixed to said housing for controlling said pilot piston valve selectively to open and close said ports in said sleeve valve to apply said fluid through said passageway to said control cylinder, whereby when said pilot piston valve is displaced, said sleeve valve is displaced in the same direction under increased pressure further to control the closing of said sleeve valve ports and discontinue the displacement of said control piston valve, thereby providing a flow of fluid through said output port that varies in proportion to the displacement of said pilot piston valve relative to said housing; and stops formed with said housing to cooperate with said motor means to limit the motion of said pilot piston valve in a given direction while permitting the continued motion of said sleeve valve and said control valve in cooperation with said lever, whereby when said motion of said pilot piston valve has been limited by said stops, fluid under pressure continues to be impressed on said sleeve valve to shear through such particles as may become wedged between said pilot piston valve and said sleeve valve.

References Cited in the file of this patent

UNITED STATES PATENTS 2,771,062     Hayner _____ Nov. 20, 1956